April 20, 1937.  E. H. TOMPKINS  2,077,864
HOSE COUPLING
Filed May 2, 1936
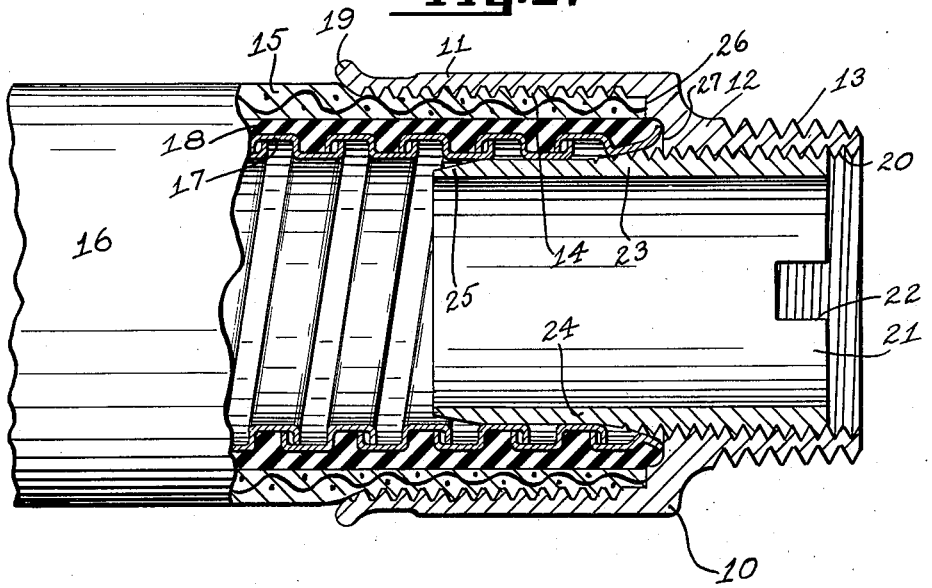
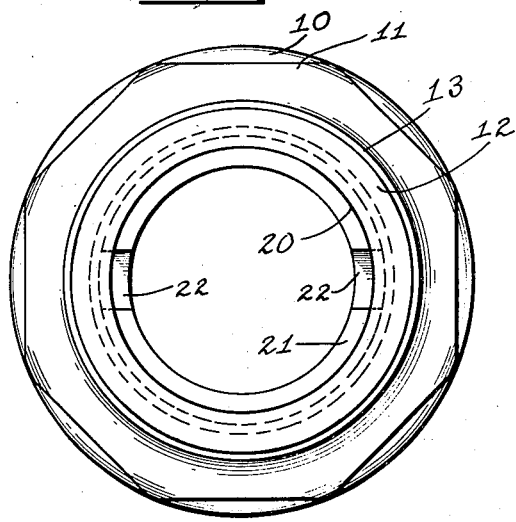
INVENTOR
Emerson H. Tompkins.
BY
H. G. Manning
ATTORNEY Patented Apr. 20, 1937

2,077,864

UNITED STATES PATENT OFFICE 2,077,864

HOSE COUPLING

Emerson H. Tompkins, Waterbury, Conn., assignor to Scovill Manufacturing Company, Waterbury, Conn., a corporation of Connecticut Application May 2, 1936, Serial No. 77,552

2 Claims. (Cl. 285—84)

This invention relates to hose couplings, and more particularly to a coupling adapted to be attached to a gasoline hose having an interior flexible metal liner commonly covered with rubber and woven fabric.

One object of this invention is to provide a gasoline hose coupling of the above nature having an outside body member adapted to be screwed upon the exterior of the hose fabric, and a wedge screw mounted within the interior of the body to expand the end of the hose outwardly against the surrounding body member to effect a tight seal therebetween.

A further object is to provide a hose coupling of the above nature in which the wedge screw is provided with an unthreaded reduced extension adapted to enter the flexible metal lining in the interior of the hose when the coupling is being screwed into position and to thereafter prevent twisting or unlocking of the overlapping helical convolutions of said metal lining.

A further object is to provide a hose coupling of the above nature in which the interior of the body section is stepped to provide an outer annular shoulder for the outer fabric of the hose, and an inner annular shoulder into which the end of the metal liner and surrounding portion of the rubber hose will be expanded when the wedge screw is screwed into position.

A further object is to provide a gasoline hose coupling of the above nature which will be simple in construction, inexpensive to manufacture, easy to install and manipulate, compact, and very efficient and durable in use.

With these and other objects in view, there has been illustrated on the accompanying drawing one form in which the invention may be conveniently embodied in practice.

In the drawing:

Fig. 1 represents a longitudinal sectional view of a gasoline hose coupling embodying the invention.

Fig. 2 is an end view of the same.

In the use of threaded hose couplings having an interior short wedge member for entering the metal lining of a rubber and fabric covered gasoline hose, it was found that the action of screwing the coupling upon the end of the hose was quite apt to unlock the end convolutions of the metal lining. Consequently, there was danger that when the hose adjacent the coupling was subjected to severe bending stresses, the hose would yield and an unlocking action of the metal lining would travel along the helical strips until it reached the exterior of the coupling member. Under these circumstances, the hose would sometimes become so weakened that breakage would occur at a point just beyond the inner rim of the coupling member.

By means of the present invention, the above and other disadvantages have been avoided. This has been accomplished by providing the wedge member with an elongated cylindrical neck or bushing extending from the threaded portion of the interior wedge member for fitting tightly within the interior of the metal lining. The interlocked helical convolutions of the lining will thus be backed up and prevented from pulling apart not only when the coupling is being screwed into position upon the end of the hose, but during the subsequent use of the gasoline hose.

This application is a continuation in part of a prior copending application by the same applicant filed October 10, 1935, Serial No. 44,337, for Hose couplings.

Referring now to the drawing in which like reference numerals denote corresponding parts throughout the several views, the numeral 10 indicates generally a hollow male coupling member consisting of a rear octagonal-shaped shell 11 and a forward smaller cylindrical section 12 having exterior threads 13.

The shell 11 is tapped to provide an interior thread 14 which is adapted to engage upon an outer fabric 15, such as canvas, of a gasoline hose 16, herein shown as of the conventional type. The hose is also provided with a flexible metal lining 17 made from helically wound strip of metal having overlapping interlocking opposed grooves, and an intermediate soft rubber filler 18 surrounded by the canvas covering 15. The inner end of the shell 11 is preferably formed with an outwardly flared skirt 19 to facilitate the insertion of the hose therein.

The cylindrical forward section 12 of the coupling is tapped to provide an interior thread 20 for detachably and adjustably receiving an exteriorly threaded wedge screw 21. The outer end of the wedge screw 21 is provided with a pair of opposed slots 22 into which a suitable tool, not shown, may be introduced for forcing said screw tightly into the interior of the gasoline hose.

The intermediate portion of the wedge screw 21 is tapered at 23 for causing it to wedge against the inner metal liner 17 tightly to expand it outwardly and compress the rubber filler 18 and outer fabric covering outwardly against the tapped shell 11. The inner end of the intermediate tapered section 23 terminates in a rearwardly extending reduced cylindrical neck extension 24 which is adapted to fit tightly within the metal liner 17. The extension 24 serves to prevent the expansion and unlocking of the convolutions of the helically wound liner 17. The inner end of the neck extension 24 is beveled at 25 to facilitate its entrance into the liner 17.

In order to provide a more effective seal for the end of the hose 16 in the inside of the shell 11, provision is made of an annular shoulder having two steps 26 and 27.

Operation

Before assembling the coupling member upon the hose the wedge screw 24 will be screwed outwardly for a short distance by a suitable T-ended tool, not shown, and the shell portion 11 will be screwed upon the outer covering 15 of the hose as far as it will go. The wedge screw will then be screwed to the left by said tool, as viewed in Fig. 1, causing the conical section 23 thereof to expand the end of the metal lining 17 and force it into abutment with the inner step 27 of the shoulder in the shell 11. The sharp corner of said shoulder between the steps 26 and 27 will thus become embedded in the hose covering 15, thereby producing a more effective liquid-tight seal. The tightness of this seal will be still further enhanced due to the inward crowding of the covering 15 against the rubber filler 18 during the first operation of assembling the coupling described above.

This is caused by the fact that the covering 15 will strike the outer step 26 before the rubber filler 18 and metal lining 17. The inner step 27 also serves to limit the expansion of the metal lining 17, and thus prevents it from cutting the rubber filler 18. The extension neck 24 holds the helical convolutions of the lining 17 in parallelism with the axis of the hose and prevents the possibility of any unlocking of said convolutions and possible leakage to occur.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new and for which it is desired to secure Letters Patent, is:

1. In a hose coupling, an exterior body member comprising an interiorly threaded hose receiving section and an attachment portion, an interior wedge sleeve screwed into said attachment portion, said sleeve having an intermediate tapered section and a cylindrical neck extending therefrom a substantial distance and adapted to engage snugly within the interior of the metal liner of a flexible hose assembled to the hose receiving section of said coupling, said tapered section being adapted to expand the end of said hose into liquid-tight engagement with said hose receiving section, said neck having a beveled extremity to facilitate the insertion of said neck into the interior of said hose liner.

2. In a hose coupling, an exterior body member comprising a hose receiving section and an attachment portion, an interior wedge sleeve screwed into said attachment portion, said sleeve having an intermediate tapered section and a cylindrical neck extending therefrom a substantial distance and adapted to engage snugly within the interior of a flexible hose assembled to said coupling, said tapered section being adapted to expand the end of said hose into liquid-tight engagement with said hose receiving section.

EMERSON H. TOMPKINS.